United States Patent [19]
Greck et al.

[11] 4,420,493
[45] Dec. 13, 1983

[54] MEAT SUPPORT AND METHOD OF USE

[75] Inventors: Edward T. Greck, Amherst, N.Y.

[73] Assignee: Neat Products, Inc., Amherst, N.Y.

[21] Appl. No.: 487,105

[22] Filed: Apr. 21, 1983

Related U.S. Application Data

[63] Continuation-in-part of Ser. No. 297,701, Aug. 31, 1981, abandoned.

[51] Int. Cl.³ .............................................. A47J 37/04
[52] U.S. Cl. ..................... 426/420; 99/419; 248/309 A; 426/132; 426/523; D7/409
[58] Field of Search ............... 99/419, 425, 421 HV, 99/421 V, 426, 448, 445, 444, 449; 248/309.2; 211/59.1, 125; 411/477; 426/113, 523, 128, 132, 420; D7/130, 85, 106

[56] References Cited

U.S. PATENT DOCUMENTS

| | | | |
|---|---|---|---|
| 75,673 | 3/1868 | Gibson | D7/97 |
| 156,797 | 11/1874 | Jones | 99/425 |
| 543,916 | 8/1895 | Wharf | 99/419 |
| 931,587 | 8/1909 | Fairbanks | 99/419 |
| 997,653 | 7/1911 | Doersch | 99/419 |
| 1,090,840 | 3/1914 | Dougherty | 211/125 |
| 1,344,915 | 6/1920 | Love | 99/446 |
| 1,630,188 | 5/1927 | Knauf | 99/419 |
| 1,890,907 | 12/1932 | Hoover | 99/419 |
| 1,939,342 | 12/1933 | Edwards | 426/128 |
| 2,111,456 | 3/1938 | Markle | 99/419 |
| 2,284,422 | 5/1942 | Hall | 411/477 |
| 2,452,629 | 11/1948 | Bonekamp | 426/128 |
| 2,584,295 | 2/1952 | Sanzenbacher | 99/419 |
| 2,772,627 | 12/1956 | Newell | 99/425 |
| 2,821,904 | 2/1958 | Arcabosso | 99/419 |
| 2,835,480 | 5/1958 | Perer | D7/106 |
| 2,875,683 | 3/1959 | Burns | 99/425 |
| 3,053,169 | 9/1962 | Rappaport | 99/421 V |
| 3,113,505 | 12/1963 | Keppler | 426/523 |
| 3,256,806 | 6/1966 | Jordan | 99/444 |
| 3,958,504 | 5/1976 | Levin | D7/85 |
| 4,260,060 | 4/1981 | Faller | 426/113 |

OTHER PUBLICATIONS

Nu-Flex Co. Publication, date unknown.
Modern Packaging 3/56, p. 190.

*Primary Examiner*—Steven L. Weinstein
*Attorney, Agent, or Firm*—James J. Ralabate

[57] ABSTRACT

Supports for meat or poultry to be roasted or baked to maintain the meat or poultry spaced above the bottom of the roasting pan. Each support has a pair of horizontally spaced rounded feet and a raised central portion between the feet. A prong or tine is struck upwardly from the central portion of each support and extends vertically to be stuck into the bottom of the meat or poultry. A plurality of supports will be employed depending on the size and horizontal extent of the meat or poultry.

10 Claims, 4 Drawing Figures

MEAT SUPPORT AND METHOD OF USE

This Application is a continuation in part of application Ser. No. 297,701 filed in the U.S. Patent and Trademark Office Aug. 31, 1981, now abandoned.

This invention relates to a cooking aid to be used during roasting, and, more specifically, to a novel and useful apparatus for cooking roasts, poultry and the like.

BACKGROUND OF THE INVENTION

In cooking roasts, the meat is generally in contact with the bottom of the cooking pan, resulting in a sticking of the meat to the pan as it cooks. The result usually is a scorched pan and an under- or unevenly-cooked meat portion. Any gravy formed during the cooking is generally wasted since it is singed with the bottom portion of the meat. More likely, the gravy that is formed is not available to the cook since to remove the gravy usually means removing the meat first. This causes the lengthening of the cooking time and an interruption in the uniform cooking of the meat. The meat generally remains immersed in the meat juices or grease, and has a tendency to reabsorb the grease flowing around it. If the moisture content of the meat is low, the lower portion of the roast is, in effect, fried to a crust. If the moisture content of the meat is high, the lower part of the roast is stewed in the meat juices and grease, and much flavor is lost.

Not only is the meat not properly and uniformly cooked, but contact with the bottom of the cooking pan causes a difficult cleaning problem. The scorched meat contacted portion of the pan requires scouring and substantial rubbing with cleaning pads or soap to remove the scorched crust formed thereby. As noted above, the gravy and grease usually burn away or are absorbed by the meat portion when the roast or poultry is in direct contact with the bottom of the cooking pan. Thus, prior cooking devices where the roast is in contact with the pan causes the constant rise in the rendered liquid constituents resulting from the cooking operation. This results in grease saturation of the lower portion of the roast, heat charring of the meat and pan, and consequent sticking of the roast to the receptacle where heat concentration is relatively great.

There are known apparatus for holding the meat above the bottom of the cooking vessel; however, many of these are integral with the pan itself and these raised portions are themselves scorched or encrusted by the grease formed. Also being fixed to the pan, these support portions cannot be used if meat is to be cooked in portions at variance with the size of the pan. Other devices used during roasting of meats are expensive to manufacture and awkward to use. Those movable supports that have been used are generally sharp ended or pointed metal that could cause a safety problem. Because of these drawbacks, few meat support devices have attained any marked commercial success.

SUMMARY OF THE INVENTION

It is therefore an object of this invention to provide a meat support and cooking device devoid of the above noted disadvantages.

Another object of this invention is to provide a movable meat support device that is economical to manufacture and substantially easy to use.

Another further object of this invention is to provide a cooking aid for holding a roast above the surface of a cooking pan and isolating the meat from the greases and meat juices formed during cooking.

A further object is to provide a meat support which eliminates the charring and burning of the bottom of the pan during the cooking operation.

A still further object of this invention is to provide a safe, yet efficient device useful to uniformly cook on all sides of meats, poultry and the like.

Another still further object is to provide a cooking aid that can be removably secured to the bottom portion of a roast and supports it at both varied and uniform distances from the bottom of the cooking vessel.

Still another further object is to provide a meat support that promotes even cooking of the roast, and reduces cooking time.

The foregoing objects and others are accomplished in accordance with this invention by providing a meat support to be used in cooking or roasting which comprises a semi-circular metallic structure, having terminal rounded ends. The upper arch or raised portion of the support is equidistant between the two rounded end portions and comprises an upwardly directed prong for piercing engagement with said meat. The prong is integral with this raised intermediate portion and extends therefrom in the form of an elongated triangle with the shorter base portion integral with said intermediate portion. The length of the prong is slightly shorter than the length of each leg portion. This permits near maximum length for the prong and provides deeper and more secure penetration into the meat or poultry. The supports of this invention are adapted to be used in the bottom portion of a meat roast in any desired spaced arrangement. Usually three or four of these supports will be used to support all parts of the lower portion of the roast. This provides firm support for the meat above the bottom of the roasting pan and above the gravy or juice which normally collects there.

The support device useful in this invention comprises (a) a main raised support portion formed by bending a flat blank material into a semi-circular configuration.

(b) A triangular-shaped prong is integral with said main support portion and extends upwardly therefrom. This main raised support portion comprises substantially rounded sections on each end thereof and has an intermediate section therebetween at a substantially higher semi-circular elevation than said ends. The triangular-shaped prong is integral at its base portion with said intermediate section. The substantially rounded ends are adapted to contact and rest in point contact with the bottom of a cooking vessel. The intermediate section has a substantially planar surface wherein any point on a transverse line drawn across the width of said surface is substantially equidistant from the bottom surface of said cooking vessel. The portions of said intermediate section immediately and horizontally adjacent to said prong are substantially parallel with the said surface of said cooking vessel. This gives the meat improved support and holds it above the surface of the cooking vessel. The prong in the support device of this invention has a length just slightly shorter than one-half the length of said main raised support portion and extends upwardly from said main raised support portion in a substantially perpendicular manner. The projecting prong can be cut out of said main raised support portion and can be attached thereto only at its triangular base portion. Alternatively, the prong can be a separate piece that is attached to the raised support portion by welding, soldering or the like. If the material is nonmetallic, the entire support device with prong is molded in one piece.

The support device can be made from metal, synthetic materials such as plastics or fiber glass and comprises a main raised support portion having the configuration of a segment of a cylinder. Attached to this raised portion is a triangular-shaped prong extending upwardly therefrom. The main raised support portion comprises substantially rounded sections on each end of said segment. The triangular-shaped prong extends upwardly from the apex of said main raised support portion and is integral therewith at its triangular base portion.

The rounded ends are adapted to contact and rest in point contact with the bottom of a cooking vessel. All points on the segmented cylindrical surface of said main raised support portion are substantially equidistant from the longitudinal axis of said cylinder.

The devices or supports of this invention are easily and economically manufactured. The device can be stamped or formed from a flat strip or piece of metal having rounded end portions. A prong is struck out of the center portion of this flat piece and this piece is then bent into a semi-circular configuration with the two rounded end portions equidistant from the center of the piece, and the prong projecting upwardly from this mid portion. The rounded ends are adapted to rest in rounded point contact with the bottom of a cooking pan.

As noted above, alternating the supports of this invention can be manufactured or molded from any suitable plastic or synthetic material having the proper physical properties. Proper temperature and inert properties are necessary for use with food. Typical plastic materials include high density polymeric materials such as polyamides, polyvinyl chloride, polyethylene, polycarbonates, polyurethanes, or any other suitable polymer or plastic. The configuration of this plastic embodiment will resemble a segment of a cylinder having a prong projecting upwardly from the highest point of said segment.

PREFERRED EMBODIMENT OF THE INVENTION

The present invention provides individual support devices which are adapted to be applied to the bottom of a cut of meat or a poultry item in any desired spacing or arrangement. Usually three or four such support devices will be used in combination to support all parts of the roast firmly in an elevated position above the bottom of the roasting pan and above the gravy or juice which normally collects there.

The support devices of the present invention comprise very simple metal stampings which are readily washed and may be stored in a small space when not in use. Each support comprises a more or less semi-circular strip of metal and adapted to rest at its opposite ends on the bottom of the roasting pan and having a tong or prong struck upwardly therefrom medially of the semi-circular strip. While only one prong is showing in drawings and described herein, it is understood that more than one prong may be used if desired.

Any suitable material may be used to make the support devices of this invention. Typical materials are aluminum, steel, nickel, copper or mixtures and alloys thereof. Any synthetic material that could be non-reactive at high temperatures and non-toxic could also be used if desired. Relatively inert plastics, glass silicone materials, or fiberglass could be considered if they have the proper thermal and chemical stability and non-toxicity. Aluminum and prepared plastics are the preferred materials of manufacture.

It is important to the present invention that the terminal or end portions be rounded for proper stability when they are inserted into the meat or poultry. Generally, three or four support devices of this invention are used at one time, and the configuration of the rounded ends provides a means of maintaining the desired distance from the bottom of the cooking vessel. If the ends were squared or not rounded, the meat would not be properly supported, especially in those cases where the bottom meat surface was irregular. In the present invention, the pan bottom can contact any point on the circumference of the support ends, and still all of the supports used will maintain pan contact.

DESCRIPTION OF THE DRAWING AND PREFERRED EMBODIMENTS

Figure 1:
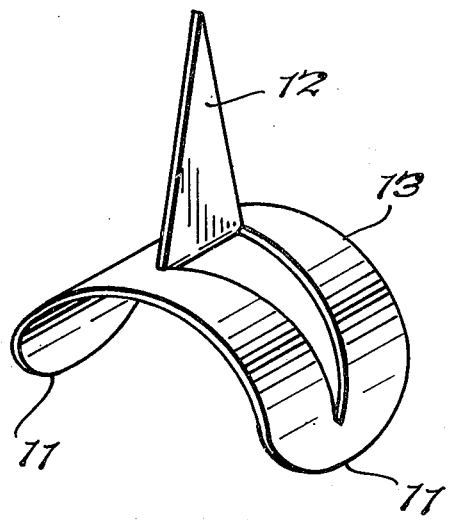
FIG. 1 is a perspective view of one form of the meat support of the present invention.

In FIG. 1, the meat support of this invention is illustrated. It comprises a pair of rounded end portions 11 adapted to contact and rest in rounded point contact with the bottom 16 of a cooking pan (see FIG. 3). An integral intermediate portion is located at a substantially higher elevation than the rounded end portions 11. The end portions 11 and intermediate portion form a semi-circular configuration having an upwardly projecting prong 12 formed from said blank 10 and leaving therein a void. The surface of the support in FIG. 1 maintains its flat surface as it existed prior to bending into semi-circular form. The length of prong 12 is slightly shorter than the length of ends 11 to center of support. This is important since it permits the longest possible prong and yet does not compromise the strength of support ends 11. Prong 12 is attached to the main portion or intermediate portion at the base of the elongated triangle formed by the prong.

Figure 2:
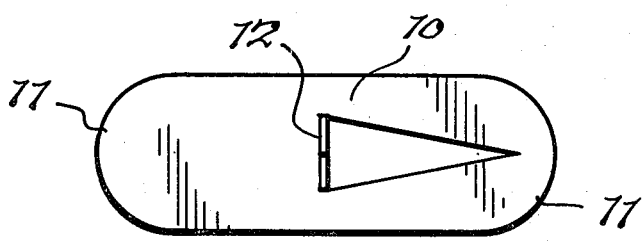
FIG. 2 is a top plan view of the device of FIG. 1 as it appears prior to the semicircular formation thereof.
Figure 3:
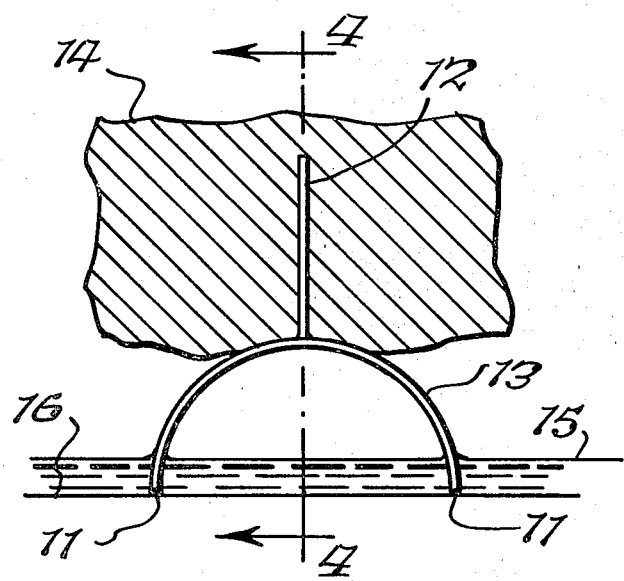
FIG. 3 is a side elevational view of the device of FIG. 1 with a meat portion impaled thereon.
Figure 4:
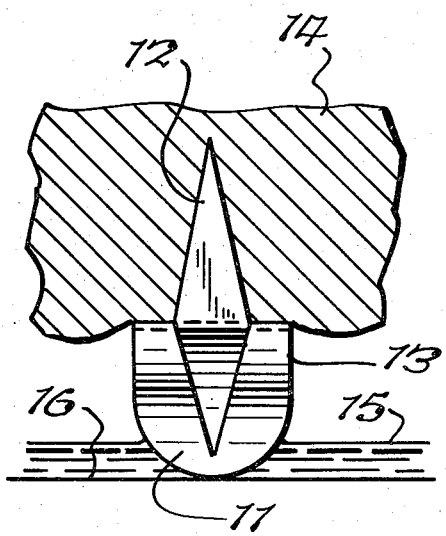
FIG. 4 is an end elevational view of the device of FIGS. 1 and 3 with a meat portion shown as indicated by the line 4—4 of FIG. 3.

As shown in FIG. 2, the support of FIGS. 1, 3 and 4 is fabricated by first forming a flat metal blank 10 having rounded ends as at 11 and then piercing the same to form a pointed tang or prong 12 at right angles to blank 10. The blank 10 is then bent to semi-circular form as shown at 13 in FIGS. 1, 3 and 4.

The rounded ends 11 of the support illustrated herein provide secure seating of the supports in the roasting pan and the number of supports employed may be varied according to the size and shape of the meat or poultry to be roasted or baked. In most cases, the number of supports will be three or four. As shown in FIGS. 3 and 4, the holders support the meat or poultry, which is indicated fragmentarily at 14, well above the juice or gravy indicated at 15 in those figures. The interior bottom surface of the roasting pan is designated 16 in FIGS. 3 and 4.

The drawings show in FIGS. 1, 3 and 4 the preferred support device of this invention useful in cooking meats. This device comprises a main raised support portion formed by bending the flat blank metal or non-metal material 10 into a semi-circular or cylindrical configuration as shown at 13. A triangular-shaped prong 12 is formed that is integral with said main support portion at its base (12 in FIG. 2) and extends upwardly therefrom as shown in FIGS. 1, 3 and 4.

The main raised support portion comprises substantially rounded end sections 11 on each end thereof and has an intermediate section therebetween at a substantially higher semi-circular elevation than the end portions 11. The triangular-shaped prong 12 is integral with said intermediate section, and attached thereto at its base portion, as shown in FIGS. 3 and 4. The substantially rounded ends 11 are adapted to contact and rest in point contact with the bottom of a cooking vessel as shown in FIG. 4. The intermediate section has a planar surface as shown in FIGS. 1, 2 and 4 wherein any point on a transverse line drawn across the width of said surface is substantially equidistant from the bottom surface of the cooking vessel 16. The portions of the intermediate section immediately and horizontally adjacent said prong as shown in FIGS. 3 and 4 are substantially parallel with the surface 16 of said cooking vessel.

The device of this invention as shown in the drawings can be also described as resembling a segment of a cylinder as shown in FIGS. 1 and 3 having a prong projecting from the apex of said segment. The device of this invention can be bent or molded from synthetic materials into its final segmented cylindrical form. All points on the surface of this cylinder segment are substantially equidistant from the longitudinal axis of the cylinder as shown in FIG. 3. A cylinder by definition must have a flat surface, and any segments of a cylinder will also have a flat surface as in FIGS. 1 and 3.

The preferred embodiment of the present invention has been described herein and shown in the accompanying drawing to illustrate the underlying principles of the invention, but it is to be understood that numerous modifications may be made without departing from the broad spirit and scope of the invention.

What is claimed is:

1. A support device useful in cooking meats comprising:
   (a) a main raised support portion formed by bending an elongated planar flat sheet into a semi-circular configuration, said elongated planar flat sheet having along its length an intermediate portion and opposite end portions including rounded edges across the width of said elongated planar flat sheet; and
   (b) a triangular-shaped prong integral with said main support portion and extending upwardly therefrom for piercing engagement with meat to be cooked; said semi-circular main raised support portion comprising said end portions including one of said round edges on each end thereof and said intermediate section therebetween at a substantially higher elevation than said end portions, said triangular-shaped prong integral with said intermediate section and attached thereto at the base portion of said triangular prong, said rounded edges adapted to contact and rest in only point contact with the bottom of a cooking vessel, said semi-circular main raised support portion having a horizontally planar surface wherein any point on a transverse line drawn across any part of the width of said surface is substantially equidistant from the bottom surface of said cooking vessel, and wherein the portions of said intermediate section immediately and horizontally adjacent to said prong are substantially parallel with the said surface of said cooking vessel; said support device dimensioned and shaped to be used in combination with a plurality of other said support devices such that said supports, being applied to the bottom surface of meat to be cooked by piercing, supports said meat above the bottom of a cooking pan with said rounded edges in point contact with the pan.

2. The supporting device of claim 1 wherein said triangular prong has a length just slightly shorter than one-half the length of said main raised support portion.

3. The supporting device of claim 1 wherein said prong extends upwardly from said main raised support portion in a substantially perpendicular manner.

4. The supporting device of claim 1 wherein said upwardly projecting prong is cut out of said main raised support portion and is attached thereto only at its triangular base portion.

5. The support device of claim 1 wherein said device having sufficiently rounded end edges to permit the device to fall on its side when not in use, and wherein said prong will project horizontally therefrom.

6. An elongated support device useful in cooking meats comprising:
   (a) a semi-circular main raised support portion and
   (b) a triangular-shaped prong integral with said main support portion and extending upwardly therefrom for piercing engagement with meat to be cooked; said main raised support portion comprising in the longitudinal direction, opposite end portions including rounded edges across the width of said device and on each end thereof and an intermediate section between said opposite end portions at a substantially higher elevation than said end portions, said triangular-shaped prong integral with said intermediate section and attached thereto at the base portion of said triangular prong, said rounded edges adapted to contact and rest in only point contact with the bottom of a cooking vessel, said semi-circular main raised portion having a horizontally planar surface wherein any point on a transverse line drawn across any part of the width of said surface is substantially equidistant from the bottom surface of said cooking vessel, and wherein the portions of said intermediate section immediately and horizontally adjacent to said prong are substantially parallel with the said surface of said cooking vessel; said support device dimensioned and shaped to be use in combination with a plurality of other said support devices such that said supports, being applied to the bottom surface of meat to be cooked by piercing, supports said meat above the bottom of a cooking pan with said rounded edges in point contact with the pan.

7. The support device of claim 6 wherein said device is molded in one piece from a synthetic material.

8. The support of claim 6 wherein said device is molded in one piece from a member selected from the group consisting of polycarbonates, nylon, polybutylene, polypropylene, polyethylene, their copolymers and mixtures thereof.

9. The support of claim 6 wherein the device is metal.

10. The method of supporting meat or poultry to be roasted or baked in a position above the bottom of a roasting pan by applying to the bottom of the meat or poultry a plurality of spaced supports constructed according to claim 1 or 6.

* * * * *